United States Patent [19]

Yoshioka et al.

[11] 4,294,494

[45] Oct. 13, 1981

[54] SLIDING-TYPE BEARING

[75] Inventors: Masahiro Yoshioka; Toshifumi Koike, both of Ibaraki; Hideki Izumi, Tsuchiura, all of Japan

[73] Assignee: Hitachi, Ltd., Tokyo, Japan

[21] Appl. No.: 97,698

[22] Filed: Nov. 27, 1979

[30] Foreign Application Priority Data

Dec. 4, 1978 [JP] Japan .................................. 53-149117

[51] Int. Cl.³ .............................................. F16C 1/24
[52] U.S. Cl. ........................................ 308/76; 308/122
[58] Field of Search ................. 308/76, 122, 240, 108, 308/77, 78, 123, 107, 127

[56] References Cited

U.S. PATENT DOCUMENTS

| | | | |
|---|---|---|---|
| 1,378,559 | 5/1921 | Roberts | 308/76 |
| 3,550,971 | 12/1970 | Wochnik | 308/76 |
| 3,753,517 | 8/1973 | Takenaka et al. | 308/107 |
| 3,923,125 | 12/1975 | Rosenthal | 308/76 |

*Primary Examiner*—Lenard A. Footland
*Attorney, Agent, or Firm*—Craig and Antonelli

[57] ABSTRACT

The invention is concerned with a sliding-type bearing suitable for use in high-speed rotary machines. The sliding-type bearing has a bearing surface provided with a lubricating oil groove at each of two portions thereof substantially 90° spaced from the point to which the load exerted by the bearing is applied. A chamfer is formed in the portion of the bearing surface near one of the two lubricating oil grooves remoter from the point of the minimum bearing clearance which is determined by the direction of rotation of the shaft and the direction of application of the load by the rotary shaft. This chamfer permits the discharge of the heated lubricating oil to the outside of the bearing thereby to prevent the same from flowing into the point of the minimum bearing clearance.

6 Claims, 8 Drawing Figures

SLIDING-TYPE BEARING

BACKGROUND OF THE INVENTION

1. Field of the Invention

The present invention relates to a sliding-type bearing for rotary machines, suitable particularly for use in high-speed rotary machines.

2. Description of the Prior Art

Generally, the shaft of a high-speed rotary machine is supported by sliding-type bearings each having a sliding surface provided with two lubrication oil supplying grooves formed at portions thereof substantially perpendicular to the direction of application of weight of the shaft. In this type of bearing, it is important to suppress the rise of temperature of the oil film for maintaining the performance of the bearing. As a matter of fact, however, it is extremely difficult to directly measure the temperature of the oil film. Therefore, practically, the temperature of the oil film is estimated from the actually measured temperatures of the bearing at a plurality of preselected points around the bearing surface.

The temperature of the bearing of the kind described usually exhibits a tendency as explained below.

Namely, the circumferential temperature distribution of the bearing, starting from the position of the oil groove remoter from the portion of minimum bearing clearance (This minimum clearance is determined by the direction of rotation of the rotary shaft and the direction of load) and measured in the direction of rotation of the shaft, is such that the bearing temperature is higher at the position of the oil groove (point of 0°) remote from the load point than at the position of the oil groove (point of 180°) closer to the point of load, i.e. closer to the point of the minimum bearing clearance. The highest bearing temperature is observed at portions around the point of 90° from the above-mentioned starting point. Also, the bearing temperature at the point of 180° is substantially equal to the temperature of the lubrication oil entering the bearing. Therefore, as the rotation speed of the rotary shaft is increased, the temperatures at the oil groove remoter from the load point and at the point 90° apart from this oil groove in the direction of rotation are raised inconveniently. Particularly, a high temperature exceeding the maximum allowable temperature is often generated at the point of the maximum temperature. As the maximum allowable temperature is exceeded, the bearing surface is softened to reduce the mechanical strength, often resulting in a seizure between the rotary shaft and the bearing surface.

The rise of the bearing temperature is substantially equivalent to the temperature rise of the oil film. As the oil film temperature rises, the viscosity of the latter is lowered to cause a destruction of the oil film to incur the seizure.

Various countermeasures can be taken to overcome the seizure between the shaft and the bearing: (a) to lower the oil temperature at the bearing inlet, (b) to increase the oil pressure, (c) to increase the bearing clearance, (d) to provide a cooling jacket, and so forth. The measure (a), however, requires a larger capacity of the oil cooler, while the method (b) necessitates an oil pump operable at a high delivery pressure, resulting in a raised cost of the lubricating system. The method (c) incurs a larger amplitude of the vibration of the rotary shaft, while the measure (d) impractically complicates the bearing construction. Thus, as a matter of fact, there has been no practically usable measure effective to avoid the seizure between the rotary shaft and the bearing.

SUMMARY OF THE INVENTION

It is, therefore, a major object of the invention to provide a sliding-type bearing capable of avoiding the seizure between the rotary shaft and the bearing.

It is another object of the invention to provide a sliding-type bearing which can lower the bearing temperature.

It is still another object of the invention to provide a sliding-type bearing suitable for use in high-speed rotary machines.

To these ends, according to the invention, there is provided a sliding-type bearing having a bearing surface provided at its two portions substantially 90° apart from the point of load exerted by the rotary shaft with lubrication oil supplying grooves, wherein the improvement comprises a chamfer provided in the bearing surface around one of the oil grooves which is remoter from the point of minimum bearing clearance determined by the direction of rotation of the shaft and the direction of application of load, the chamfer being communicating with the above-mentioned one of the oil grooves and opening to one side of the bearing, whereby the heated lubrication oil is not introduced to the point of minimum bearing but is discharged through the chamfer.

Other objects, features and advantages of the invention will become more clear from the following description of the preferred embodiments taken in conjunction with the accompanying drawings.

DESCRIPTION OF THE PREFERRED EMBODIMENTS

Figure 1:
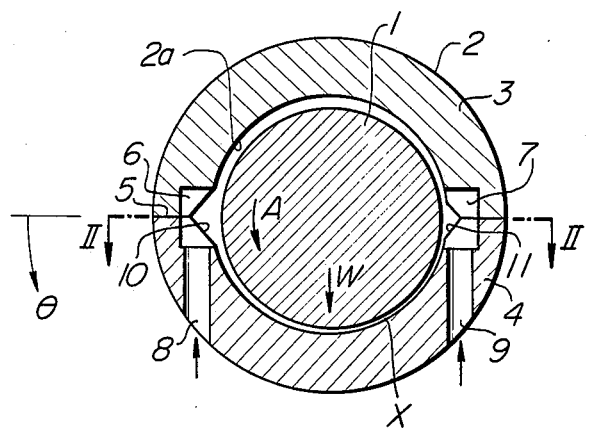
FIG. 1 is a cross-sectional view of a sliding-type bearing which is an embodiment of the invention.
Figure 2:
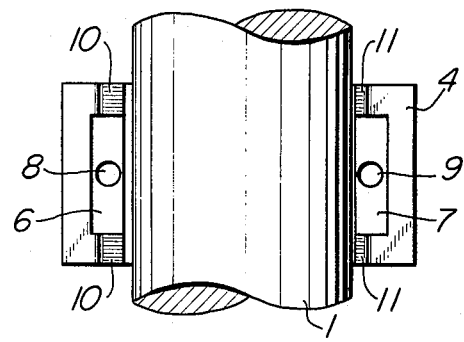
FIG. 2 is a sectional view of the bearing taken along the line II—II of FIG. 1.

Referring first to FIGS. 1 and 2 showing an embodiment of the invention, a rotary shaft 1 and a sliding-type bearing of the invention are designated, respectively, at reference numerals 1 and 2. The sliding-type bearing 2 is composed of an upper bearing half 3 and a lower bearing half 4 and has a true circular bearing surface 2a. Lubrication oil grooves 6, 7 are provided at the juncture surfaces 5 of the upper and the lower bearing halves 3, 5. The lubrication oil grooves 6, 7 are adapted to receive a cooled lubrication oil supplied through oil supplying ports 8 and 9. In the described embodiment, one 6 of the lubrication oil grooves is located at a position remoter from the point X of the minimum bearing clearance which is determined by the direction A of rotation of the rotary shaft 1 and the direction W of the load exerted by the rotary shaft 1, while the other lubrication oil groove 7 is located at a point closer to the point X of the minimum bearing clearance. Thus, the lubrication oil groove 6 is located remote from the loading point, while the oil groove 7 is located closer to the loading point.

In the portions of the bearing surface near the lubrication oil grooves 6, 7, formed are chamfers 10, 11 which communicate, respectively, with the lubrication oil grooves 6, 7 and opening in the sides of the bearing. The chamfer 10 communicating with the lubrication oil groove 6 has a size greater than that of the chamfer 11 communicating with the lubrication oil groove 7. These chamfers 10, 11 has a function to discharge the dusts suspended by the lubrication oil and contributes to the reduction of the lubrication oil temperature.

These chamfers preferably have such sizes that the total flow rate of the lubrication oil passing through the chamfers 10, 11 is greater than that flowing through the chamfers provided in the conventional sliding-type bearing. In the conventional sliding-type bearing, the chamfers closer to the loading point and remoter from the same have an equal size. By selecting the sizes of the chamfers 10, 11 as stated above, it is possible to maintain an oil discharge rate equivalent to that of the conventional sliding-type bearing. This means that the sliding-type bearing of the invention does not require any increase of rate of supply of the lubrication oil.

The sliding-type bearing heretofore described operates in a manner explained hereinunder.

Cooled lubricating oil is supplied to the lubricating oil grooves 6, 7 through the oil supplying ports 8, 9 respectively. The lubricating oil supplied to the lubricating oil groove 6 is then fed into the minimum bearing clearance, accompanying the peripheral surface of the rotating shaft 1. The temperature of the lubricating oil is increased in the area around this minimum bearing clearance. The lubricating oil thus heated is then moved to the area near the other lubricating oil groove 7, accompanying the peripheral surface of the rotating shaft 1, and is cooled by the cooled lubricating oil which has been supplied via the lubricating oil groove 7. The lubricating oil is then discharged to the outside of the bearing through the chamfer 11. Therefore, the lubricating oil in this state has a temperature slightly higher than the temperature of the cooled oil entering the bearing.

Then, the lubricating oil flows toward the lubricating oil groove 6, accompanying the peripheral surface of the rotating shaft 1, during which the oil temperature is gradually increased. Thus, the lubricating oil has been heated to a temperature much higher than the temperature of the cooled lubricating oil entering the bearing, when it reaches the lubricating oil groove 6. Most part of this lubricating oil is discharged to the outside of the bearing through the chamfer 10 having a size greater than the chamfer 11, together with a part of the cooled lubricating oil supplied to the lubricating oil groove 6.

In consequence, only a small amount of the heated lubricating oil is introduced to the point X of the minimum bearing clearance, together with the cooled lubricating oil coming through the lubricating oil groove 6, accompanying the peripheral surface of the rotating shaft 1.

It will be seen that the above-described circulation of the lubricating oil taking place in the bearing effectively lowers the temperature of the lubricating oil as a whole. For this reason, the maximum oil film temperature which is generated at the point 90° apart from the lubricating oil groove in the direction of rotation of the rotary shaft 1 is effectively lowered, which in turn increases the viscosity of the lubricating oil to prevent the seizure attributable to the breakage of the oil film. The lowered maximum oil film temperature, on the other hand, lowers the temperature of the bearing surface at the portion of the bearing where the maximum oil film temperature is established, so that the undesirable softening of the bearing surface at that portion is effectively suppressed to prevent the seizure which originates in the softening of the bearing metal.

Figure 3:
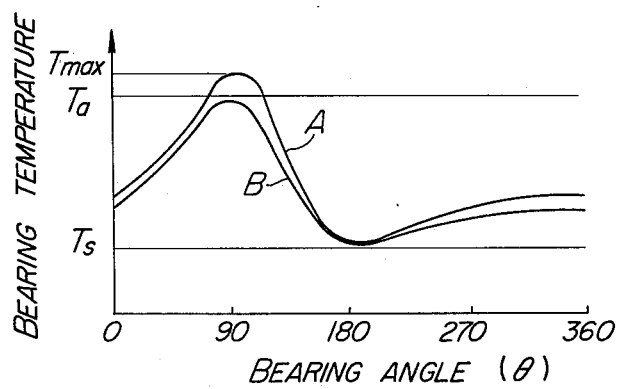
FIG. 3 is a chart showing the temperature distribution in the embodiment of the sliding-type bearing of the invention shown in FIG. 1, in comparison with that of a typical conventional sliding-type bearing.

FIG. 3 shows the bearing temperature distribution as observed in the sliding-type bearing of the invention shown in FIGS. 1 and 2, in comparison with the bearing temperature distribution in a conventional sliding-type bearing in which both chamfers have an equal size. More specifically, in FIG. 3, the axis of abscissa represents the angle $\theta$ of the bearing, while the axis of ordinate represents the bearing temperature. The temperature distributions of the conventional sliding-type bearing and the sliding-type bearing of the invention are shown by curves A and B, respectively. As will be clearly understood from these characteristic curves, maximum temperature Tmax exceeding the maximum allowable temperature Ta is observed around the point of 90° in the conventional bearing. In sharp contrast to the above, in the sliding-type bearing of the invention, the maximum bearing temperature is maintained at a level lower than the maximum allowable temperature, and the temperature of the bearing as a whole can be lowered as compared with that of the conventional bearing. The symbol Ts represents a temperature of the cooled lubrication oil supplied to the bearing.

Figure 4:
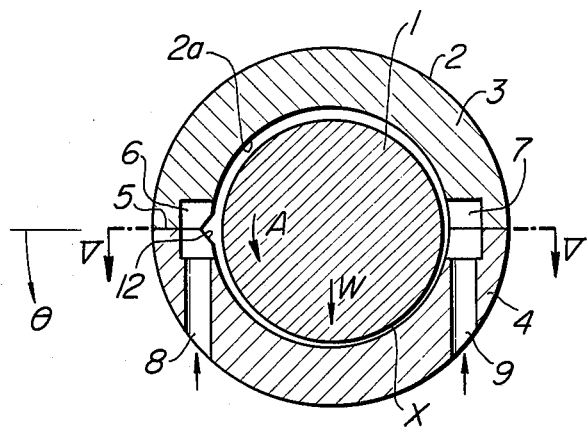
FIG. 4 is a cross-sectional view of a sliding-type bearing which is another embodiment of the invention.
Figure 5:
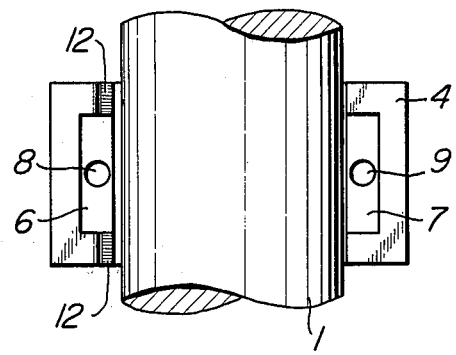
FIG. 5 is a sectional view of the bearing taken along the line V—V of FIG. 4.

FIGS. 4 and 5 show another embodiment of the invention in which the same reference numerals are used to denote the same parts or members as those of the embodiment shown in FIGS. 1 and 2. In this embodiment, only the portion of the bearing surface near the lubricating oil groove 6 is provided with the chamfer 12, and the portion of the bearing surface near the lubricating oil groove 7 is not provided with any chamfer. The sole chamfer 12 is so sized, as in the case of the first embodiment, that the flow rate of the oil discharged through this chamfer 12 is equal to the flow rate of the oil discharged through the chamfers in the conventional sliding-type bearing.

Figure 6:
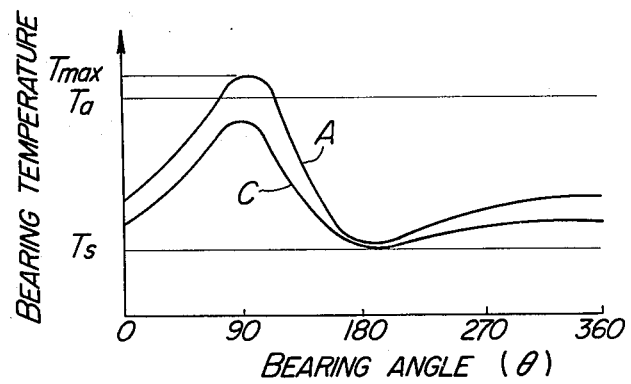
FIG. 6 is a chart showing the temperature distribution in the embodiment of the sliding-type bearing of the invention shown in FIG. 4, in comparison with that of a typical conventional sliding-type bearing.

In this embodiment, the chamfer 12 is associated with the lubricating oil groove 6 permits the discharge of the heated lubricating oil to the outside of the bearing, together with the cooled lubricating oil supplied to the lubricating oil groove 6, as in the case of the first embodiment. Therefore, the sufficiently cooled lubricating oil coming from the lubricating oil groove 6 is fed into the point X of the minimum bearing clearance to effectively lower the lubricating oil temperature. Thus, the sliding-type bearing of the invention exhibits a temperature distribution as shown by a curve C in FIG. 6. It will be seen how the bearing temperature is lowered as compared with the conventional sliding-type bearing the temperature distribution in which is shown by a curve A of the same Figure.

Figure 7:
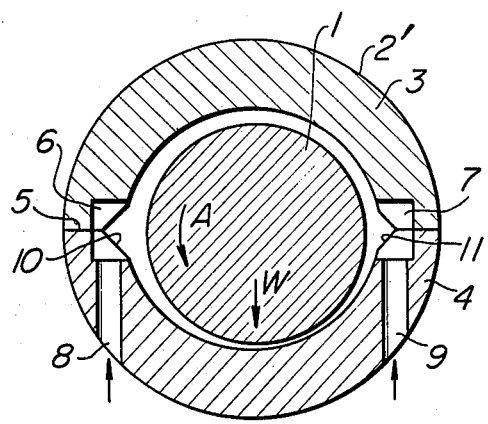
FIG. 7 is a cross-sectional view of an elliptical sliding-type bearing to which an embodiment of the invention is applied.
Figure 8:
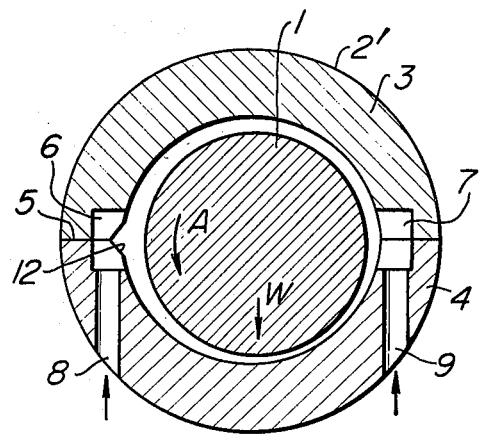
FIG. 8 is a cross-sectional view of an oval sliding-type bearing to which another embodiment of the invention is applied.

Although the invention has been described through specific embodiments applied to the sliding-type bearings having true-circular form of the bearing surface, this is not exclusive and the invention can be applied to the bearings having elliptical bearing surface. Namely, it is possible to provide chamfers 10, 11 at the portions of an elliptical bearing surface near the lubricating oil supplying grooves 6 and 7, as shown in FIG. 7. It is also possible to provide a chamfer 12 only at the portion of the bearing surface near the lubricating oil supply groove 6.

As has been described, according to the invention, a chamfer is formed at the portion of the bearing surface near the lubricating oil groove remoter from the point of the minimum bearing clearance. This chamfer permits the discharge of the heated lubricating oil to the outside of the bearing and the supply of the cooled lubricating oil to the portion of the minimum bearing clearance. As a result, the bearing temperature, as well as the lubricating oil film temperature, is effectively lowered to avoid the unfavorable seizure between the rotary shaft and the bearing. It will be clear to those skilled in the art that the sliding-type bearing of the invention will stands the use in high-speed rotary machines.

What is claimed is:

1. In a sliding-type bearing having a bearing surface provided with a lubricating oil groove at each of two portions thereof substantially 90° apart from the point to which the load of a rotary shaft is applied, an improvement which comprises: a chamfer formed in at least the portion of the bearing surface near one of the lubricating oil groove remoter from the point of the minimum bearing clearance determined by the direction of rotation of the shaft and by the direction of application of the load, said chamfer being communicated with said one of said lubricating oil groove and opening at the side of said bearing, said chamfer being adapted to permit the discharge of the heated lubrication oil to the outside of said bearing together with the cooled lubricating oil supplied to said one of said lubricating oil grooves.

2. A sliding-type bearing as claimed in claim 1, wherein said chamfer is provided only at the portion of the bearing surface remoter from said point of the minimum bearing clearance.

3. A sliding-type bearing as claimed in claim 1, wherein said chamfer is provided in each of the portions of said bearing surface near said lubricating oil groove remoter from said point of the minimum bearing clearance and near said lubricating oil groove closer to the point of the minimum bearing clearance, wherein the chamfer communicating with said lubricating oil groove remoter from said point of the minimum bearing clearance has a size greater than that of said chamfer communicating with said lubricating oil groove closer to said point of the minimum bearing clearance.

4. A sliding-type bearing as claimed in claim 2 or 3, characterized in that said bearing surface has a circular form.

5. A sliding-type bearing as claimed in claim 2 or 3, characterized in that said bearing surface has an elliptical form.

6. A sliding-type bearing as claimed in any one of claims 1, 2, or 3, wherein said bearing is a split-type bearing.

* * * * *